March 11, 1969 J. J. ROUSSO, JR 3,432,806

METHOD AND APPARATUS FOR RECORDING IDENTIFYING DATA ON SEISMIC RECORDS

Filed June 20, 1967 Sheet 3 of 4

United States Patent Office 3,432,806
Patented Mar. 11, 1969

3,432,806
METHOD AND APPARATUS FOR RECORDING IDENTIFYING DATA ON SEISMIC RECORDS
Jack J. Rousso, Jr., Dallas, Tex., assignor to Mobil Oil Corporation, a corporation of New York
Filed June 20, 1967, Ser. No. 647,471
U.S. Cl. 340—15.5 10 Claims
Int. Cl. G01v *1/00*

ABSTRACT OF THE DISCLOSURE

The specification discloses a method and apparatus for recording identifying data such as record numbers and magnetic tape reel numbers on a seismic cross section. Markers are recorded as part of selected traces in the upper margin of the cross section before the beginning of seismic data. The presence of a marker on a trace represents a binary "one" digit and the absence of a marker on a trace represents a binary "zero" digit.

BACKGROUND OF THE INVENTION

*Field of the invention*

This invention relates to oscillographic recording and more particularly to the visual recording of identifying data on a seismic record section comprised of traces recorded in side-by-side relation to represent seismic data.

*Description of the prior art*

Modern-day seismic exploration data is recorded in the field on magnetic tape in either analog or digital form. These magnetic tapes are then transmitted to a processing center where certain processing steps are applied through the use of various types of computing equipment. After all the processing steps have been applied, the seismic data is recorded as traces in side-by-side relation to form a seismic cross section which is representative of a cross section of the earth's layering. Seismologists interpret the seismic cross sections in a search for geologic structures which may contain oil or gas deposits.

Often it is desirable to have certain identifying data on a cross section. For example, it is often desired to identify positively the magnetic tape storage location of a particular group of traces on a cross section. After a visual cross section has been produced, the seismologist may wish to have additional processing steps applied to the data or perhaps have additional cross sections made from the original magnetic tapes. In the case of seismic data recorded in digital form, identification of the storage location of the magnetic tape must give the reel number of the reel containing the magnetic tape and the record number associated with each group of traces on a cross section.

The main prior art method of recording identifying data associated with a seismic cross section, such as reel numbers and record numbers, is with a separate instruction sheet that is filled in by the processing operators. This form of identification is easily susceptible of errors caused by illegibility, writing down the wrong numbers, transposing digits within the numbers, etc. The prior art has only one way of verifying absolutely that the storage location of the seismic data on a cross section is the same as that given on the associated instruction sheet: By preparing a new cross section from the data on the magnetic tape listed on the instruction sheet and then comparing the new cross section with the previous cross section for identity. This comparison costs not only the price of the additional recording medium, but also valuable time for operators and playback machines. If the comparison of the two cross sections proves to show dissimilar data, then it is evident that the wrong identification numbers are recorded on the instruction sheet and there is no way of retrieving the data from magnetic tape storage associated with the cross section.

One prior art device does provide automatic recording of the record number of seismic data on a visual cross section. This device, known as TIDAR or Texas Instruments' Digital-Analog Recorder, is capable of producing a record number coded as pulses on a single channel of a visual cross section. The pulse code comprises pulses of two different levels to indicate the two digits of the binary number system. Because this pulse code is a train of pulses in a sigle channel, it must be applied to a type of recording which can distinguish two discrete levels of amplitude relative to a reference level. Thus, it cannot be used with variable area or variable density recording of seismic data.

*Summary of the invention*

This invention provides a method and apparatus for producing identifying data or numbers, such as a record number, in any type of recording format on a seismic cross section or other record having a plurality of traces recorded in side-by-side relation. The identifying data is represented by a marker code in channelized form. A marker is recorded as part of selected ones of the traces in the upper margin of the cross section before the beginning of seismic data. The presence or absence of a marker on each trace represents one binary digit of an identifying number. Therefore, this invention is not limited to any particular type of recording or recorder machine. The probability of misinterpreting the marker code is minimized because only the presence or absence of a marker on a single channel indiciates a single digit.

In one embodiment of this invention, markers appearing on selected ones of the traces at a first transverse level indicate the magnetic tape reel number in the binary coded decimal system. Also, markers appearing on a second transverse level represent the record number associated with the seismic data represented by the traces in the binary-octal number system.

*Detailed description of specific embodiments*

Figure 1:
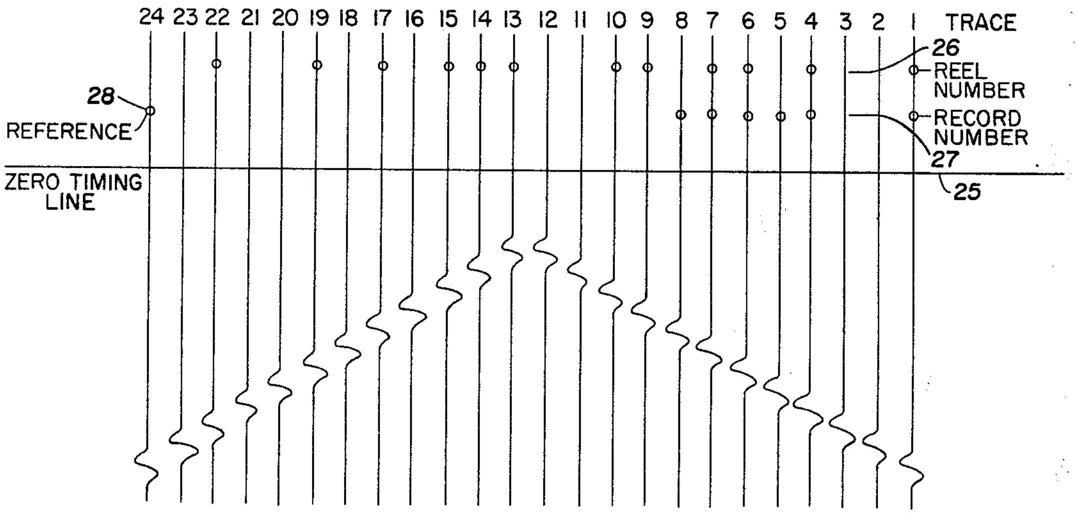
FIGURE 1 is a diagrammatic illustration of a portion of a seismic cross section indicating the identification numbers applied in accordance with this invention.

In FIGURE 1 is a diagrammatic example of a group of twenty-four traces which may, for example, be one segment of a large seismic record section of many traces. The identification number markers produced in accordance with this invention appear in the upper margin of the record section above the level where the seismic data begins. Since the time of arrival of seismic wave events varies from prospect to prospect, it is best to locate the identification number markers in the margin above the zero timing line 25. In an actual seismic record section timing lines would follow at equal increments below the zero timing line 25, but there would oridnarily be no timing lines applied above the zero timing line 25.

The two examples of identification numbers to be described below will be the reel number indicated on a first transverse level 26 and the record number located at a second transverse level 27. The reel number refers to the number of the reel containing the magnetic tape having the encoded seismic data corresponding with the group of traces illustrated in FIGURE 1. The record number refers to the magnetically encoded number associated with the corresponding seismic data on magnetic tape. The record number must be specified because a single magnetic tape may comprise many different groups of traces each comprising a record.

The record and reel numbers in FIGURE 1 are designated in code form by markers appearing on the traces at transverse levels 26 and 27. As illustrated, the markers are small circles superimposed on selected traces. In the embodiment to be described, the presence of a marker on a trace indicates a "one" digit in the binary number system. The absence of a marker on a trace indicates a "zero" digit in the binary number system. In the embodiment to be described, the reel number markers on level 26 are associated with traces 1–24. The record number markers on level 27 are associated with only traces 1–10.

A reference marker 28 is recorded on trace 24 at the same level 27 as the record number code to indicate the location of a group of traces associated with a given record. On a large record section containing many groups of seismic traces associated with individual records, an interpreter may locate an individual record by use of the reference marker 28. Once the reference marker 28 is located, the code associated with the record and reel numbers may be read from left to right. In other words, on a seismic record section there would appear a reference marker on the trace unshown but placed immediately to the right of trace 1. The least significant digit of the record and reel number appears on trace 1 immediately to the left of a reference marker and significance of digits increases from right to left.

*Reel number identification*

Figure 2:
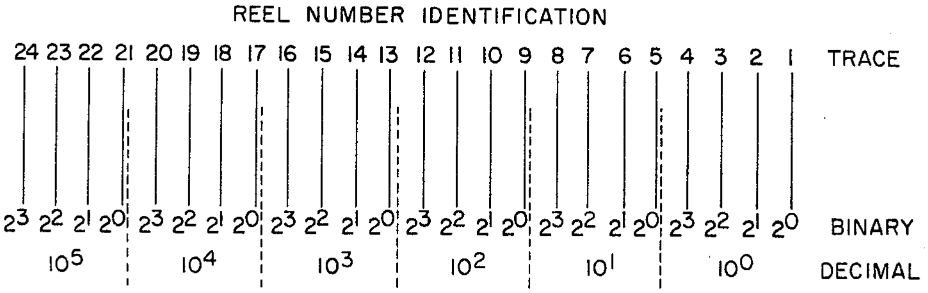
FIGURE 2 illustrates the identification of the reel number code in accordance with this invention.

The code for the reel number identification is, in a preferred embodiment, related to the binary coded decimal number system as indicated in FIGURE 2. The binary coded decimal system is preferred because the reel number must be set in to the recording system by a human operator who is accustomed to dealing with the decimal number system. The binary coded decimal system lends itself readily to input in the decimal number system and recording in the binary number system.

As indicated in FIGURE 2, each digit in the decimal number system is realized by summing the binary equivalent numbers contained in a group of four traces. More specifically, the summation of the binary equivalent numbers of the markers appearing on traces 1–4 represents the unit's digit or $10^0$. The markers on traces 5–8 represent the ten's digit or $10^1$. The markers on traces 9–12 represent the hundred's digit or $10^2$, and so on as indicated.

As an example of the identification of a reel number consider the marker code for the reel number given at level 26 in FIGURE 1. The binary-decimal code conversion is as follows:

| | | | | | | |
|---|---|---|---|---|---|---|
| 0 0 1 0, | 0 1 0 1, | 0 1 1 1, | 0 0 1 1, | 0 1 1 0, | 1 0 0 1 | BINARY |
| 2 | 5 | 7 | 3 | 6 | 9 | DECIMAL |

Written in more compact form the reel number is then $257{,}369_{10}$.

*Record number identification*

The marker code for the record number given at level 27 is preferably in the binary-octal number system. This code is preferred because most record numbers are customarily written in the octal number system.

Figure 3:
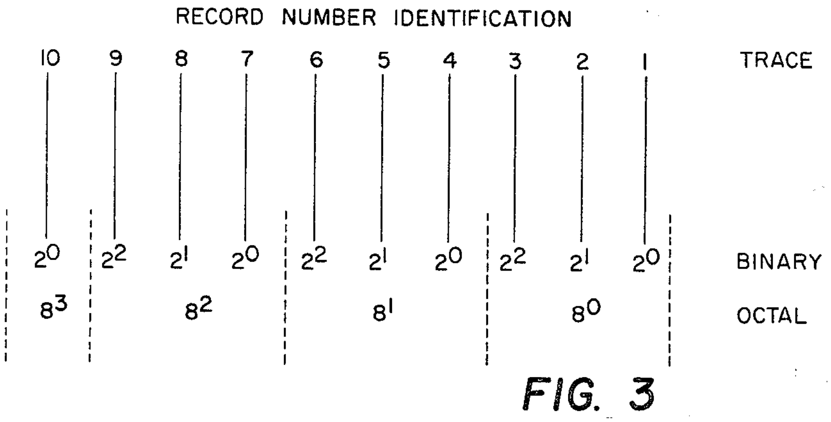
FIGURE 3 illustrates the identification of the record number code in accordance with this invention.

As indicated in FIGURE 3 each digit in the octal number system is realized by summing the binary equivalent numbers indicated by the markers in groups of three traces. The presence or absence of a marker on each trace indicates a binary digit. The significance of each binary digit proceeds from right to left beginning on the right-hand side of each group of three traces. As indicated, traces 1–3 represent the code for the least significant octal digit, $8^0$. Traces 4–6 represent the next most significant octal digit, $8^1$, and so on.

As an example of the identification of a record number, consider the marker code given at level 27 of FIGURE 1. The binary-octal conversion is as follows:

| | | | | |
|---|---|---|---|---|
| 0 0 0, | 0 1 1, | 1 1 1, | 0 0 1 | BINARY |
| 0 | 3 | 7 | 1 | OCTAL |

Written in more compact form the record number is then $371_8$.

*Code producing system*

Figure 4:
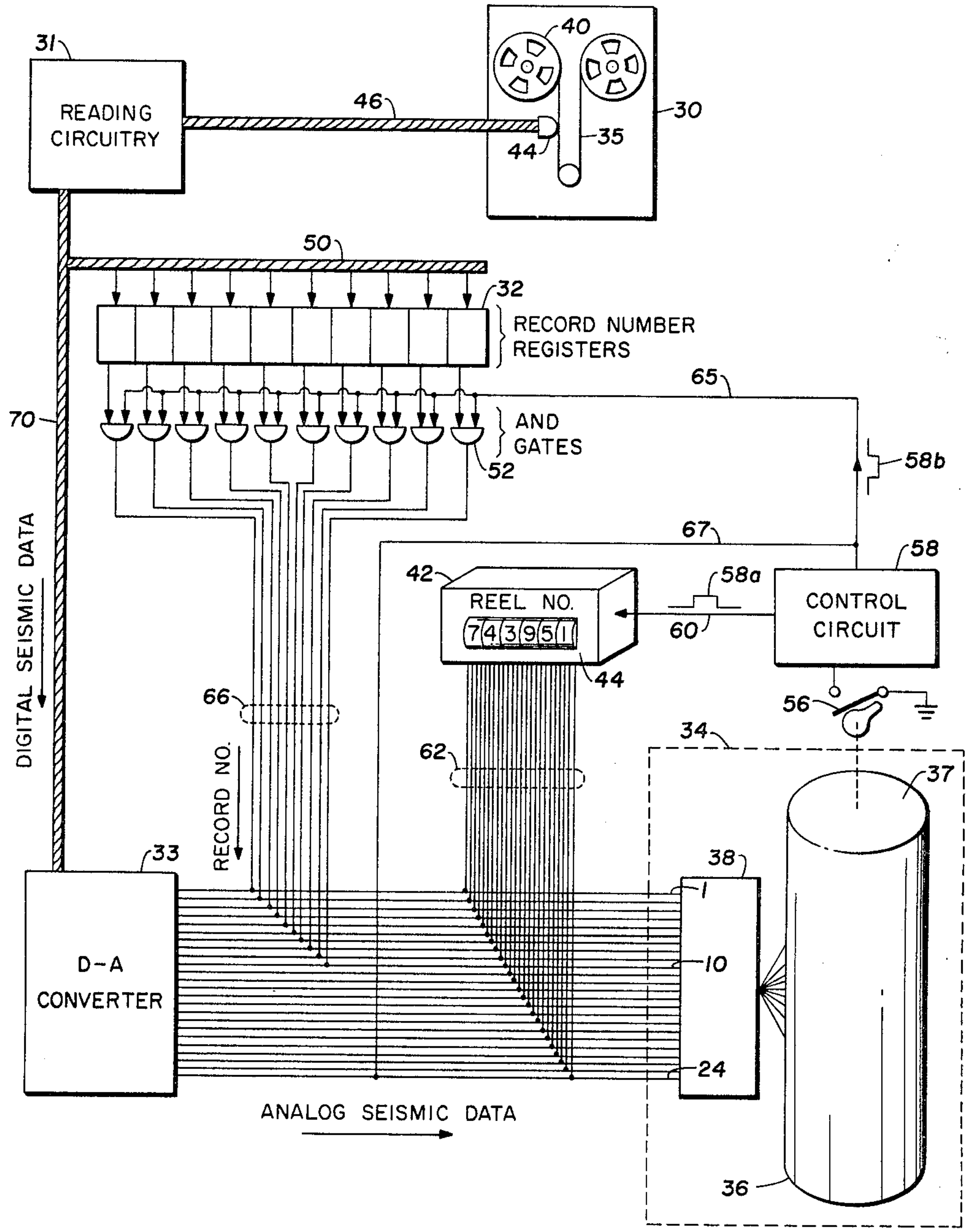
FIGURE 4 is a block schematic of a system for carrying out the method of this invention.

Referring now to FIGURE 4 there will be described the preferred embodiment of a system for carrying out the method of applying coded identifying numbers to seismic records as described above. The system of FIGURE 4 is designed to be incorporated in a system for playback of seismic data recorded in digital form on magnetic tape. Only the portions of the playback system pertinent to an understanding of this invention have been illustrated. The conventional components of the playback system are the magnetic tape transport 30, the reading circuitry 31, the record number registers 32, and the digital-to-analog converter 33. These components may be purchased as a package from Texas Instruments, Inc., Dallas, Tex., and are known as the TIDAR. The seismic section plotter 34 is also a conventional component and may be obtained from Southwestern Industrial Electronics, Houston, Tex., as Model No. MS–601.

The system of FIGURE 4 is adapted to reproduce the digitally encoded seismic data on magnetic tape 35 and record it in visual form on a photographic film 36 wrapped around recording drum 37. The recorder or plotter 34 illustrated is of the galvanometer type adapted to record twenty-four traces simultaneously, though other types of plotters may be used. The galvanometer block 38 has twenty-four separate recording channel inputs for recording of seismic signals. Following each writing of twenty-four seismic signals the galvanometer block 38 is caused to step over to a new position to begin writing a new group of seismic signals.

In accordance with this invention, coded identifying numbers are recorded on the same tracks with the seismic signals on film 36 to indicate such parameters as record number and reel number. More particularly, an operator may manually set in the reel number of magnetic tape reel 40 on the switch unit 42 before beginning playback of the tape on reel 40. Unit 42 contains finger-operated dials 44 each having indicia of the numbers in the decimal number system. When the numbers visible on dials 44 correspond with the number stamped or indicated on reel 40, the proper reel number will be produced automatically on each group of traces of a record on film 36.

Once the operator has set in the correct reel number on switch unit 42, he may start the playback system running. As the tape 35 passes across the multichannel playback heads 44, the magnetically encoded seismic data is reproduced as electrical pulses which are applied via channels 46 to the reading circuitry 31. The reading circuitry 31 contains the necessary components to decode the data recorded on tape 35. The encoded record number comprising electrical pulses flows from the output of circuitry 31 via channel 50 to the record number registers 32. The condition of the record number registers 32 is set according to the applied electrical pulse code so that the record number associated with the seismic data being played back from tape 35 is stored in registers 32. Each of the digital values of a record number is stored separately in registers 32.

In accordance with this invention, the output of each of the record number registers 32 is applied to a bank of coincidence circuits or AND gates 52. The output of each AND gate 52 is applied to a single recording channel for input to galvanometer block 38. The outputs of AND gates 52 are applied to recording channels 1–10. Each of AND gates 52 has two inputs. The presence of a signal on both inputs is required for a signal to pass through the AND gate. The output of each one of the record number registers 32 effectively conditions an AND gate in bank 52 to be open or closed.

Once the record number registers 32 have stored the current record number and the reel number has been selected in switch unit 42, the code number producing system is ready to generate the record number and reel number automatically during playback. More specifically, as the playback system begins to operate and the recording drum 37 rotates, a cam-actuated microswitch 56 generates a pulse which actuates a control circuit 58 which delivers a pair of delayed pulses **58*a* and 58*b*. The first output pulse 58*a* on channel 60 is applied to the switch unit 42. Depending upon the setting of the dials 44, selected ones of marker channels 62 are closed to the passage of pulse 58*a*, the remainder of the marker channels being open. Pulse 58*a* then passes through the open ones of marker channels 62 and is applied to the corresponding recording channels of galvanometer block 38. As the galvanometers in block 38 each generate a trace on film 36, selected galvantometers respond to pulse 58*a* to generate a marker pulse at a first transverse level on film 36** to indicate the reel number.

At a short time after generating pulse **58*a*, the control circuit 58 generates a second pulse 58*b* which is applied via channel 65 to each of the AND gates in bank 52. Depending upon the record number stored in registers 32, the pulse 58*b* will pass through selected ones of AND gates 52 through selected channels 66 and be applied to the corresponding recording channels of galvantometer block 38. Again, selected galvanometers will respond to pulse 58*b* to produce marker pulses at a second transverse level on film 36** to indicate the record number.

Pulse **58*b* is also applied via channel 67 to recording channel 24 to generate the reference marker 16** (FIGURE 1).

After the recording of the markers for the record and reel number, the recording of seismic data occurs in conventional manner. Means not shown generates timing lines for recording on film 36. Also, the seismic data in digital form is applied from the output of reading circuitry 31 via channels 70 to the digital-analog converter 33. The digital-analog converter 33 transforms the digital seismic data into analog seismic signals which are applied to the channels of galvanometer block 38. Thus, when the film 36 is developed the resulting records will each have groups of traces looking similar to FIGURE 1. The pulse **58*a* controls the generation of the markers for the reel number at transverse level 26 and the pulse 58*b* controls the generation of the markers for the record number at transverse level 27**.

Depending upon the type of recording performed by plotter 34, the markers for the code numbers will take various forms. If wiggle trace recording is used or some combination of wiggle trace and variable area, the markers will be small pulses having a spike appearance. If variable area recording is used, the markers will be just black dots or "spots." If variable density recording is being used, the markers will be darkened portions. Thus the method and apparatus of this invention are readily adaptable to many different recording formats.

For simplicity the channels 62 and 66 have been illustrated as being connected directly to certain ones of recording channels 1–24. In a preferred embodiment these channels are joined together through OR gates to prevent interference of the pulses flowing within each of the channels.

*Control circuit*

Figure 5:
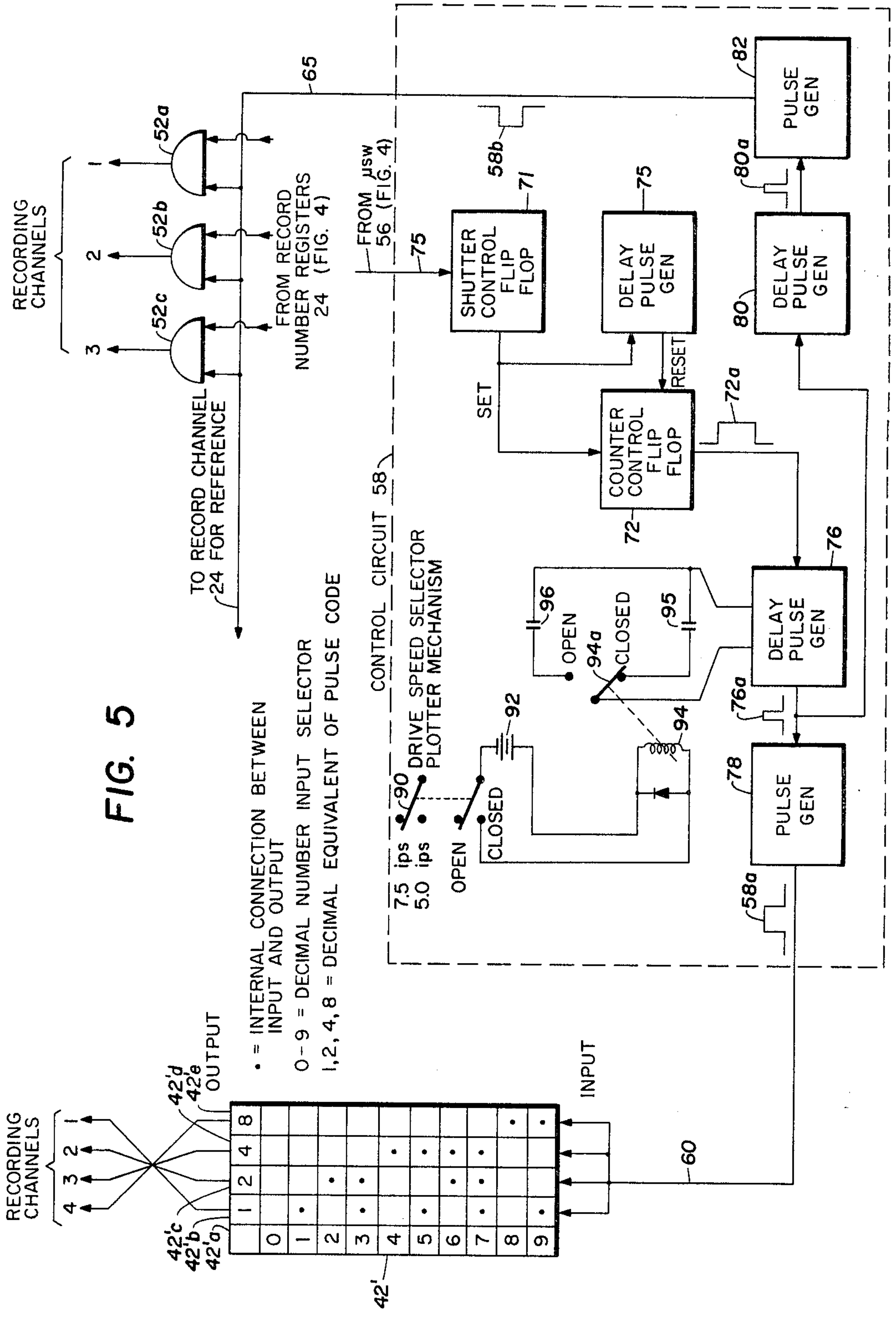
FIGURE 5 is a block schematic of the control circuit of FIGURE 4 and the associated apparatus for recording one digit of a reel number and one digit of a record number.
Figure 6:
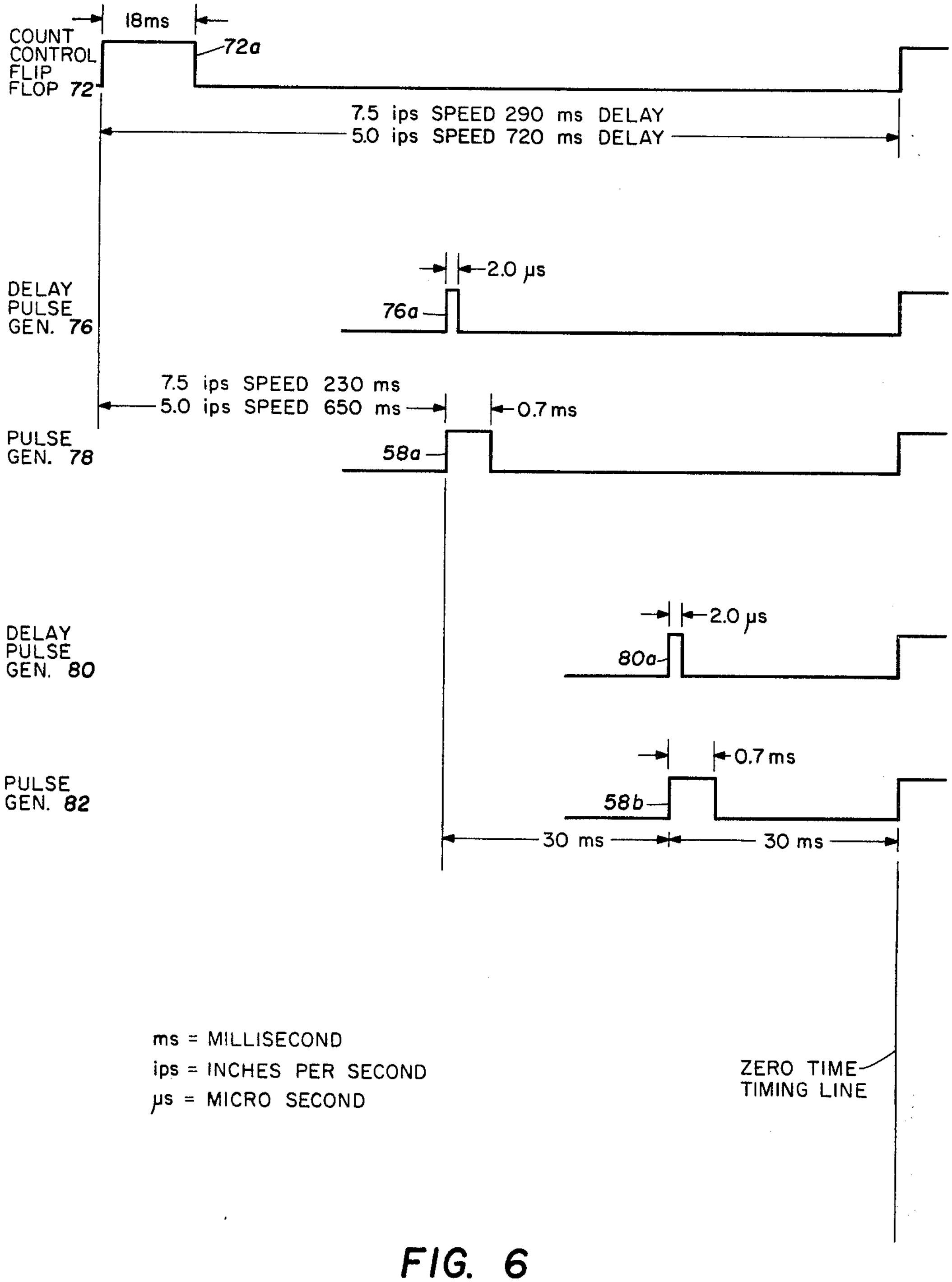
FIGURE 6 is a time chart of the pulses flowing in the circuit of FIGURE 5.

Referring to FIGURES 5 and 6 there will be described the details of the control circuit of FIGURE 4 and the associated apparatus for recording one digit of a reel number and one digit of a record number. FIGURE 6 illustrates specific time relationships of the pulses in the circuit of FIGURE 5 for one embodiment of the invention. First will be described the portion of the control circuit for producing one digit of a reel number. In the following the terminology "flip-flop" will be used to mean a bistable multivibrator.

In the control circuit 58 certain components may serve other functions in the playback system of FIGURE 4. For example, the shutter control flip-flop 71 controls the operation of the shutter associated with the galvanometers in block 38 (FIGURE 4). Also the count control flip-flop 72 initiates a certain sequence of operations associated with the digital part of the playback system of FIGURE 4. In setting up a control circuit for use in accordance with this invention to generate pulses **58*a* and 58*b*, several points in the playback circuitry could be tied into. It is important only that the pulses 58*a* and 58*b* be generated responsive to a rotational position of the recording drum. The tie point chosen for the purpose of the following description is the output of the count control flip-flop 72**.

As the recording drum rotates, microswitch 56 generates a pulse which is applied via channel 74 to trigger the shutter control flip-flop 71. The output of flip-flop 71 sets the count control flip-flop 72 which produces an output pulse **72*a*. Count control flip-flop 72 is reset by a delay pulse generator 75 to cause termination of pulse 72*a*. Pulse 72*a* triggers the delay pulse generator 76 to generate a delayed pulse 76*a*. Pulse 76*a* is lengthened by an amount suitable for application to a recording channel by the effect of pulse generator 78 which produces output pulse 58*a*. Pulse 58*a* is applied to the inputs of the switch unit 42 (FIGURE 4) via channel 60**.

The channels of switch 42 associated with a single digit have been illustrated in diagrammatic form in block 42′. Block 42′ represents channels associated with the unit's digit dial of switch 42. The numbers in vertical column **42′*a* represent the digital number setting of the unit's digit dial. The pulse 58*a* is applied to each one of the input channels of switch portion 42′. These channels are represented by the vertical columns 42′*b*–42′*e*. The dot indicated along the vertical columns 42′*b*–42′*e* indicates an internal connection between the input of the switch portion 42′ and the output. For example, suppose that the unit's digit dial is set for the digital number 2. Then there will be an internal connection between the input to channel 42′*c* and its output. All other channels associated with the unit's digit will be closed. This means that the pulse 58*a* passes through the switch portion 42′ only through channel 42′*c* and is applied to recording channel 2. Thus, depending upon the setting of the switch unit 42, the marker channels 62 are opened or closed to a condition corresponding with the reel number. The marker channels are ready to receive the reel number code generated by the switch unit 42 as soon as the pulse 58*a*** is applied.

There will now be described further details of the system for generating one digit of the record number. The pulse **76*a* from the output of delay pulse generator 76 is applied to a delay pulse generator 80 which generates a delayed pulse 80*a*. Pulse 80*a* triggers pulse generator 82 to produce pulse 58*b*. Pulse 58*b* is applied via channel 65 to the input of all the AND gates in bank 52. Only AND gates 52*a*, 52*b*, and 52*c* are illustrated. The output from each of the record number registers 32 of FIGURE 4 is also applied to the inputs of AND gates 52*a*, 52*b*, and 52*c*. If there is coincidence between voltage on the two inputs of an AND gate, pulse 58*b* passes through it and is applied to one of recording channels 1, 2 and 3. For example if voltage is present from the output of the record number registers to the input of each of AND gates 52*a* 52*b*, and 52*c*, pulse 58*b* passes through each AND gate and is applied to recording channels 1, 2, and 3** to provide markers indicative of an octal digit 7.

Thus, pulse 58_b_ produces the markers associated with the second transverse level for the record number code.

The following are certain components of the control circuit 58 used successfully in one embodiment of the invention:

| Component | Supplier designation | Supplier |
|---|---|---|
| Switch 42 | Digiswitch, Model 301B. | Digitran Corp., Pasadena, Calif. |
| Delay pulse gen. 76 and 80. | Card assembly 157400. | Texas Instruments, Dallas, Tex. |
| Pulse gen. 78 and 82 | Card assembly 156088 | Do. |
| AND gates 52 | Card assembly 153574. | Do. |

*Variable recorder speed compensation*

Often cross section plotting systems have variable speeds for plotting. In one installation of this invention, the plotter 34 of FIGURE 4 had recording speeds of 7.5 inches per second and 5 inches per second. To accommodate the change in recording speeds, the time occurrence of the marker generating pulses of this invention must be modified. In accordance with this invention, means is provided for automatically changing the time occurrence of the marker generating pulses when the recording speed is changed.

Referring to FIGURE 5, the switch 90 used for controlling the drive speed of the plotter 34 is used to automatically change the time occurrence of the marker generating pulses 58_a_ and 58_b_. More particularly, when the speed selector switch 90 is in the position for 7.5 inches per second, no adjustment is made in the time occurrence of pulses 58_a_ and 58_b_. However, when selector switch 90 is thrown to the 5.0 inches per second position, the voltage from DC voltage source 92 is applied to energize relay 94. When relay 94 is energized, its contact 94_a_ moves from the closed position where capacitor 95 is connected in circuit with delay pulse generator 76 to the open position where capacitor 96 is connected in circuit. This changes the time constant of the delay pulse generator 76 to provide a longer delay time proportionate to the slower drum rotating speed of 5 inches per second.

Thus, at the same time an operator adjusts the speed selector switch 90, the marker pulse generating system of this invention is automatically compensated to provide marker pulses at the same relative position in the margin above the zero timing line with both drum speeds.

Now that the invention has been fully described and illustrated, it may become apparent to those skilled in the art that there may be certain modifications still within the true spirit and scope of the invention. It is intended to cover all such modifications as fall within the scope of the appended claims.

What is claimed is:

1. A method of visually recording an identification code recorded in digital form on a magnetic tape along with seismic data comprising the steps of:
- (a) reproducing said identification code as electrical pulses;
- (b) storing each of said electrical pulses separately;
- (c) reproducing said seismic data as a plurality of digital signals;
- (d) converting said digital signals to analog signals;
- (e) generating a control signal at a time related to the rotational position of a recording drum;
- (f) in response to said control signal reading out said stored electrical pulses into separate channels of a visual recording system associated with said recording drum to produce marker pulses on separate recording tracks; and
- (g) applying each of said analog signals to a separate one of said recording channels for recording of seismic data on the same recording tracks with said marker pulses.

2. The method of claim 1 wherein said identification code is the record number associated with said seismic data.

3. A system for visually recording an identification code recorded in digital form on a magnetic tape along with seismic data comprising:
- (a) means for reproducing said identification code and said seismic data as digital signals;
- (b) plural means for storing the digital values of said identification code;
- (c) means for converting said seismic data from digital form into a plurality of analog seismic signals;
- (d) a visual recording system including a plurality of recording channels for recording said analog seismic signals in side-by-side relation on a recording medium on a recording drum;
- (e) a plurality of coincidence circuits, each having a pair of inputs and an output, the output of each coincidence circuit being connected to a separate one of said recording channels, one input of each coincidence circuit being connected to a separate one of said storage means; and
- (f) control circuit means responsive to a rotational position of said recording drum for generating a marker signal for application to the other input of each of said coincidence circuits whereby said marker signal may be applied through selected coincidence circuits in accordance with said identification code to selected channels of said recording medium for recording of markers thereon.

4. The system of claim 3 wherein said identification code is the record number associated with said seismic data.

5. A system as in claim 3 wherein said control circuit means comprises:
- (a) means mounted adjacent said recording drum for generating an electrical pulse at a fixed rotational position of said recording drum;
- (b) delay pulse generator means responsive to said electrical pulse for generating a delayed electrical pulse; and
- (c) pulse generator means responsive to said delayed electrical pulse for generating an electrical marker pulse for application to said coincidence circuits as said marker signal.

6. The system of claim 3 further including apparatus for automatically adjusting the position of said markers to accommodate changes to different recording drum rotating speeds by operation of a selector switch, said apparatus comprising:
- (a) a source of voltage;
- (b) relay means connected in circuit with said source of voltage and said seletcor switch, said relay means being energized in accordance with the position of said selector switch, said relay means actuating a plurality of contacts; and
- (c) means connected in circuit with said delay pulse generator means and said relay contacts to change the time delay of said delay pulse proportionate to the change in recording drum rotating speed.

7. A system as in claim 3 further including means for applying said marker signal to one of said recording channels which is unused for identification code markers to provide a reference marker for indicating the location of the group of seismic signals associated with said record number.

8. A system for visually recording identification data on a seismic record produced from recorded seismic data comprising:
- (a) means for reproducing said seismic data as a plurality of seismic signals;
- (b) a visual recording system including a plurality of recording channels for recording said seismic signals in side-by-side relation on a recording medium on a recording drum;
- (c) marker channels for connection to selected ones of said recording channels;
- (d) means mounted adjacent said recording drum for generating an electrical pulse at a fixed rotational position of said recording drum;

(e) delay pulse generator means responsive to said electrical pulse for generating a delayed electrical pulse;

(f) pulse generator means responsive to said delayed electrical pulse for generating a marker pulse for application to each of said marker channels; and (g) switch means connected in said marker channels, said switch means being manually operable to open and close selected ones of said marker channels in accordance with said identification data, whereby said marker signal may pass through selected ones of said marker channels to produce a plurality of markers on the same recording tracks of said recording medium with said seismic data.

9. The system of claim 8 further including apparatus for automatically adjusting the position of said markers to accommodate changes to different recording drum rotating speeds by operation of a selector switch, said apparatus comprising:

(a) a source of voltage;

(b) relay means connected in circuit with said source of voltage and said selector switch, said relay means being energized in accordance with the position of said selector switch, said relay means actuating a plurality of contacts; and (c) means connected in circuit with said delay pulse generator means and said relay contacts to change the time delay of said delay pulse proportionate to the change in recording drum rotating speed.

10. A system for visually recording on a seismic cross section the record number associated with seismic data, both recorded in digital form on a magnetic tape, and the reel number of the reel upon which is wound the magnetic tape comprising:

(a) means for reproducing said record number and said seismic data as digital signals;

(b) plural means for storing separately the digital values of said record number;

(c) means for converting said seismic data from digital form into a plurality of analog seismic signals;

(d) a visual recording system including a plurality of recording channels for recording said analog seismic signals in side-by-side relation on a recording medium mounted on a recording drum;

(e) a plurality of coincidence circuits, each having a pair of inputs and an output, the output of each coincidence circuit being connected to a separate one of said recording channels, one input of each coincidence circuit being connected to a separate one of said storage means;

(f) marker channels for connection to selected ones of said recording channels;

(g) switch means connected in said marker channels, said switch means being manually operable to open and close selected ones of said marker channels in accordance with a binary code for said reel number; and (h) control circuit means responsive to a rotational position of said recording drum for generating a first marker signal for application to said marker channels to generate markers on a first transverse level of said record section indicative of said reel number and for generating a second marker signal delayed from said first marker signal for application to the other input of each of said coincidence circuits to thereby generate markers on a second transverse level indicative of said record number.

References Cited

UNITED STATES PATENTS

| | | | |
|---|---|---|---|
| 3,134,957 | 5/1964 | Foote et al. | 340—15.5 |
| 3,252,148 | 5/1966 | Mitchell | 340—15.5 X |
| 3,293,608 | 12/1966 | Klein et al. | |
| 3,339,175 | 8/1967 | Forester et al. | 340—15.5 |

RODNEY D. BENNETT, Jr., *Primary Examiner.*

DANIEL C. KAUFMAN, *Assistant Examiner.*